United States Patent
Gergely et al.

(10) Patent No.: US 9,821,744 B2
(45) Date of Patent: Nov. 21, 2017

(54) ACCELERATION SENSING OF FAST ROLL AND SLOW ROLL FOR VEHICLE

(71) Applicant: Robert Bosch GmbH, Stuttgart (DE)

(72) Inventors: Treplan Gergely, Budapest (HU); Attila Sagi, Cegled (HU); Markus Laumann, Marzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/969,873

(22) Filed: Dec. 15, 2015

(65) Prior Publication Data

US 2017/0166151 A1 Jun. 15, 2017

(51) Int. Cl.
*B60R 21/0132* (2006.01)
*B60R 16/023* (2006.01)
*B60R 21/013* (2006.01)
*B60R 21/00* (2006.01)
*B60R 21/01* (2006.01)

(52) U.S. Cl.
CPC ...... *B60R 21/0133* (2014.12); *B60R 16/0233* (2013.01); *B60R 21/013* (2013.01); *B60R 21/0132* (2013.01); *B60R 2021/0018* (2013.01); *B60R 2021/01013* (2013.01); *B60R 2021/01034* (2013.01); *B60R 2021/01272* (2013.01);
(Continued)

(58) Field of Classification Search
CPC ...... B60R 21/0133; B60R 2021/01327; B60R 2021/01325; B60R 2021/0018; B60R 2021/01034; B60R 2021/01013; B60R 2021/01322
See application file for complete search history.

(56) References Cited

U.S. PATENT DOCUMENTS 5,430,649 A 7/1995 Cashler et al.
6,038,495 A 3/2000 Schiffmann
(Continued)

FOREIGN PATENT DOCUMENTS

EP 1628180 A2 2/2006
EP 1717108 A2 11/2006
EP 2065263 A1 6/2009

OTHER PUBLICATIONS

International Search Report and Written Opinion for Application No. PCT/EP2016/074288 dated Jan. 2, 2017 (10 pages).

*Primary Examiner* — Mussa A Shaawat
*Assistant Examiner* — Michael Kerrigan
(74) *Attorney, Agent, or Firm* — Michael Best & Friedrich LLP (57) ABSTRACT

A method and system for operating restraint devices in a vehicle during a fast roll event or a slow roll event includes a lateral acceleration sensor and an angular rate sensor. When the angular rate and a vertical acceleration of the vehicle predict a vehicle rollover, the system integrates the lateral acceleration from the lateral acceleration sensor to obtain a roll rate velocity. When the lateral acceleration is greater than a fast lateral acceleration threshold and the roll rate velocity is greater than a fast roll rate velocity threshold, the system provides a fast roll event output. When the lateral acceleration is less than the fast lateral acceleration threshold and greater than a slow lateral acceleration threshold while the roll rate velocity is greater than a slow roll rate velocity threshold, the system provides a slow roll event output. The system operates restraint devices based on the roll event.

13 Claims, 4 Drawing Sheets

(52) U.S. Cl.
CPC ............... *B60R 2021/01322* (2013.01); *B60R 2021/01325* (2013.01); *B60R 2021/01327* (2013.01)

(56) References Cited

U.S. PATENT DOCUMENTS

| | | |
|---|---|---|
| 6,654,671 B2 | 11/2003 | Schubert |
| 6,816,766 B2 | 11/2004 | Sala et al. |
| 7,057,503 B2 | 6/2006 | Watson |
| 7,702,440 B2 | 4/2010 | Wu et al. |
| 2002/0019719 A1 | 2/2002 | Kueblbeck et al. |
| 2006/0041336 A1 | 2/2006 | Schubert et al. |
| 2006/0253239 A1 | 11/2006 | Williams |
| 2009/0143944 A1* | 6/2009 | Park .................... B60R 21/0132 701/45 |
| 2012/0065843 A1 | 3/2012 | Thomas et al. |
| 2013/0179042 A1 | 7/2013 | Katz et al. |

* cited by examiner

ACCELERATION SENSING OF FAST ROLL AND SLOW ROLL FOR VEHICLE

BACKGROUND

The present invention relates to a rollover-sensing system and method for determining fast roll events, such as curb-tripped rollover events and slow roll events, such as soil-tripped rollover events, for a vehicle. The events are used to control side airbag inflatable curtains and seat belt pretensioners.

There are different types of rollover events. A vehicle can be involved in either an upward rollover event or a downward rollover event when the vehicle is traveling in a forward direction. A vehicle can be involved in an un-tripped rollover event when the vehicle is traveling and tilting beyond its stability angle.

A vehicle can be involved in a tripped rollover event when the vehicle is sliding laterally and hits an obstacle. For example, a vehicle can be involved in a soil- or curb-tripped rollover event. A soil-tripped or slow rollover event occurs when the vehicle is initially traveling on a roadway, and begins a slide that takes the vehicle off the roadway. As the vehicle slides off the roadway, the wheels of the vehicle may contact unpaved ground, grass, or soil. Soil may build up near the wheels of the vehicle and create a lip or mound of soil. The mound may reach a sufficient size or configuration such that it acts as a barrier over which the wheels and, consequently, causes lateral acceleration that results in a soil-tripped rollover event. A fast or curb-tripped rollover event occurs when the vehicle is initially traveling on a roadway, and then slides sideways into impact by a wheel or wheels with a curb that acts as a barrier over which the wheels and, consequently, causes a lateral acceleration greater than during a slow roll event resulting in a curb-tripped rollover event. In such a case, a lateral impact force is typically exerted against an obstacle, such as a curb, is stronger than that of a soil-tripped event.

One prior art arrangement uses a time threshold to inhibit late airbag deployment. The arrangement includes only one timer for both soil and trip curbs. The time based arrangement is not favored for various reasons. An object of the invention is to provide an arrangement for determining and differentiating slow roll events and fast roll events. For slow roll events, only a pre-tensioner is operated. For fast roll events, the pre-tensioner is operated and a side airbag inflatable curtain is deployed.

SUMMARY

In one embodiment, the invention provides a method of operating at least one restraint device in a vehicle during a fast roll event or a slow roll event, the method comprising: sensing a lateral acceleration of the vehicle; sensing a vertical acceleration of the vehicle; sensing an angular rate of the vehicle; integrating the lateral acceleration to obtain a roll rate velocity; predicting a vehicle rollover from the angular rate and the vertical acceleration; when a vehicle rollover is predicted and the lateral acceleration is greater than a fast lateral acceleration threshold and the roll rate velocity is greater than a fast roll rate velocity threshold, setting a fast roll event output; and operating the restraint device of the vehicle in response to the fast roll event output.

In one embodiment, operating the at least one restraint device in response to the fast roll event output includes deploying a side airbag, deploying an inflatable curtain and operating a seat belt pretensioner.

In another embodiment, when vehicle rollover is predicted and the lateral acceleration is less than the fast lateral acceleration threshold and greater than a slow lateral acceleration threshold and the roll rate velocity is greater than a slow roll rate velocity threshold, the method provides a slow roll event output, and operating the restraint device in response to the slow roll event includes operating a seat belt pretensioner.

One embodiment provides a plausibility error when the lateral acceleration and the roll rate velocity do not result in either a fast roll event output or a slow roll event output.

In another embodiment, operating the at least one restraint device in response to the slow roll event output is limited to operating the seat belt pretensioner.

In another embodiment, the slow roll event is a soil-tripped rollover event and the fast roll event is a curb-tripped rollover event, and the sensing of the lateral acceleration includes determining the lateral acceleration from the slope of the roll rate velocity.

In another embodiment, the invention provides a control system for at least one restraint device in a vehicle, the system comprising: an angular rate sensor for providing an angular rate of the vehicle; a vertical acceleration sensor for providing vertical acceleration of the vehicle; a lateral acceleration sensor for providing a lateral acceleration of the vehicle; and an electronic controller including a processor and a memory. The processor is configured to: predict vehicle rollover based on the angular rate and the vertical acceleration, integrate the lateral acceleration to determine a roll rate velocity, when vehicle rollover is predicted and the lateral acceleration is greater than a fast lateral acceleration threshold and the roll rate velocity is greater than a fast roll rate velocity threshold, providing a fast roll event output, and when the angular rate predicts vehicle rollover, operating the at least one restraint device in response to the fast roll event output.

In one embodiment, the at least one restraint device includes an inflatable side airbag; an inflatable curtain; a side airbag and inflatable curtain controller; and a seat belt pretensioner, In another embodiment, when vehicle rollover is predicted, operating the at least one restraint device in response to the fast roll event output includes deployment of the side airbag and deployment of the inflatable curtain by the side airbag and inflatable curtain controller, and operating of the seat belt pretensioner.

In one embodiment, the electronic controller is configured to determine when the lateral acceleration is less than the fast lateral acceleration threshold and greater than a slow lateral acceleration threshold and the roll rate velocity is greater than a slow roll rate velocity threshold to provide a slow roll event output; and wherein when vehicle rollover is predicted, operating the at least one restraint device consists of operating a seat belt pretensioner in response to the slow roll event output without operating the side airbag and inflatable curtain controller.

In another embodiment, the slow roll event output corresponds to a soil-tripped rollover event and the fast roll event output corresponds to a curb-tripped rollover event.

In one embodiment, the processor is configured to determine a plausibility error when the lateral acceleration and the roll rate velocity do not result in either the fast roll event output or the slow roll event output.

In one embodiment, the invention provides a method of operating at least one restraint device in a vehicle during a fast roll event or a slow roll event, the method comprising: sensing an angular rate of the vehicle with an angular rate sensor; sensing a vertical acceleration of the vehicle with a vertical acceleration sensor; sensing a lateral acceleration of the vehicle with a lateral acceleration sensor; integrating the lateral acceleration to obtain a roll rate velocity; predicting vehicle rollover from the angular rate and the vertical acceleration; when the lateral acceleration is greater than a fast lateral acceleration threshold and the roll rate velocity is greater than a fast roll rate velocity threshold, providing a fast roll event output; when the lateral acceleration is less than the fast lateral acceleration threshold and greater than a slow lateral acceleration threshold and the roll rate velocity is greater than a slow roll rate velocity threshold, providing a slow roll event output; and when vehicle rollover is predicted, operating the at least one restraint device in response to either the fast roll event or the slow roll event.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to both hardware and/or software. The term "memory" may include or refer to volatile memory, non-volatile memory, or a combination thereof and, in various constructions, may also store operating system software, applications/instructions data, and combinations thereof.

Figure 1:
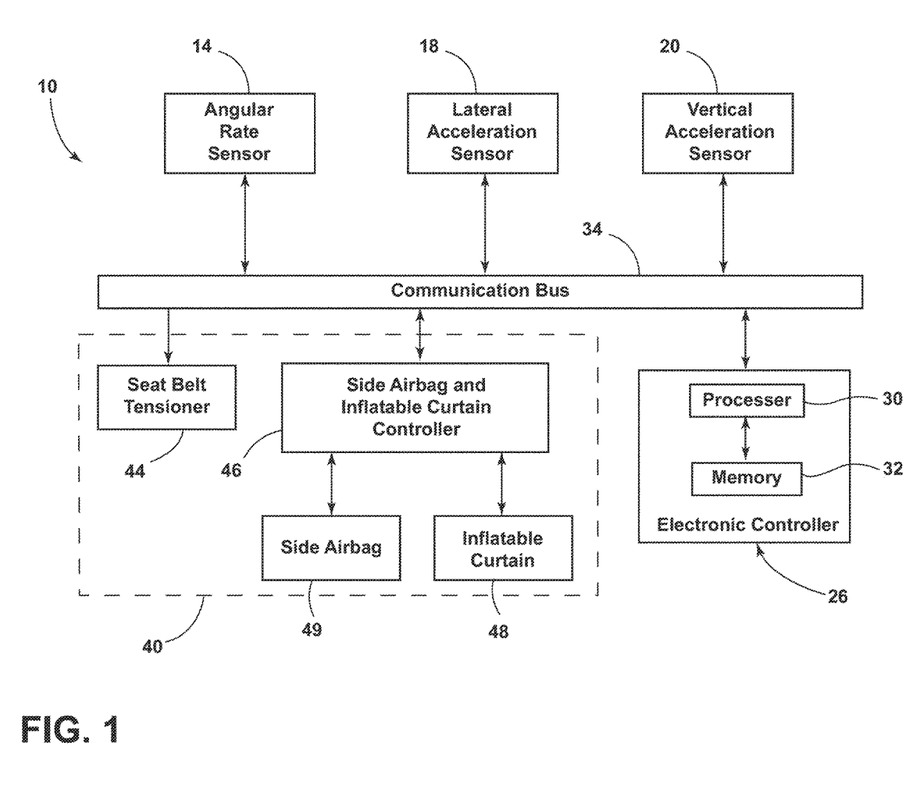
FIG. 1 is a block diagram of a control system for restraint devices in a vehicle according to one embodiment.

FIG. 1 illustrates a control system 10 for operating restraint devices in a vehicle, such as a four-wheeled car or truck. The control system 10 includes an angular rate sensor 14, a lateral acceleration sensor 18, and a vertical acceleration sensor 20. Additional sensors, such as vehicle speed sensors, tilt angle sensors or the like are contemplated.

Further, the control system 10 in the example of FIG. 1 includes an electronic controller 26 that includes a processor 30 and a memory 32. In one embodiment, the processor 30 executes a program stored in the memory 32.

In some constructions, the control system 10 shown in FIG. 1 includes a communication bus 34 that provides communication between the sensors 14, 18, 20 and the electronic controller 26. In some embodiments, the communication bus 34 is a FlexRay bus or a controller area network (CAN) bus. Other communication arrangements are contemplated.

The control system 10 shown in FIG. 1 includes restraint devices 40. The restraint devices 40 of the vehicle include one or more seat belt pretensioners 44 for pretensioning one or more seat belts in a vehicle. The restraint devices 40 include a side airbag and inflatable curtain controller 46 in communication with a side airbag inflatable curtain 48 and a side airbag 49. As shown in FIG. 1, the restraint devices 40 are in communication with the electronic controller 26 via the communication bus 34.

Figure 2:
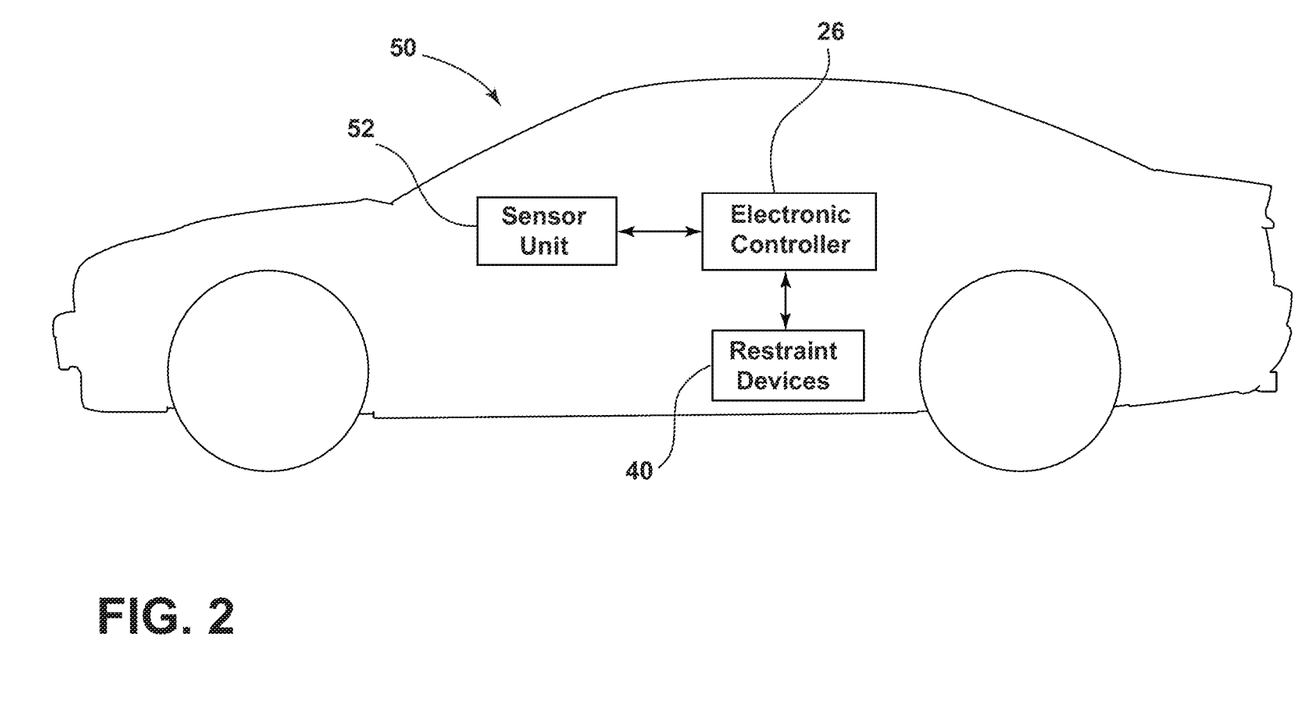
FIG. 2 is a vehicle that includes the control system for restraint devices of FIG. 1.

FIG. 2 illustrates a vehicle 50 that includes the control system 10. In this embodiment, the electronic controller 26 and a sensor unit 52 that includes the angular rate sensor 14 for sensing angular rate, the lateral acceleration sensor 18 for sensing lateral acceleration of the vehicle 50, and the vertical acceleration sensor 20 for sensing vertical acceleration are illustrated.

Operation

Figure 3:
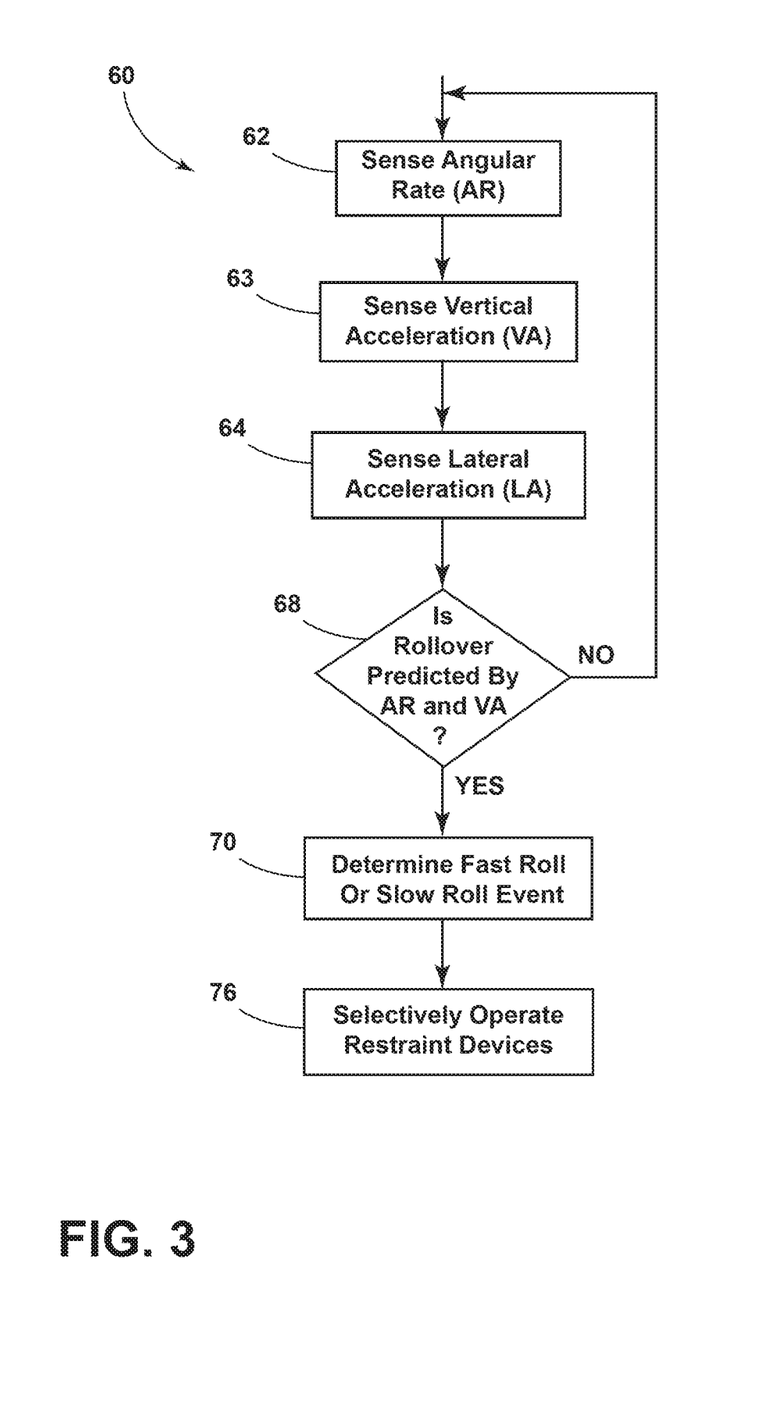
FIG. 3 is a flow chart of a method for operating the control system for restraint devices.

FIG. 3 is a flowchart 60 illustrating one method in which the control system 10 monitors for a fast roll event or a slow roll event for controlling at least one restraint device 40. The steps shown in FIG. 3 are for purposes of illustration, and thus the order of the steps can be changed in many instances while having no effect on execution of the program by the electronic controller 26. In one embodiment, the processor 30 of the electronic controller 26 is configured to execute the steps shown in FIG. 3, along with additional steps for other purposes.

The electronic controller 26 obtains an angular rate (AR) from the angular rate sensor 14 (step 62). The electronic controller 26 also obtains a vertical acceleration (VA) from the vertical acceleration sensor 20 (step 63). The electronic controller 26 also obtains a lateral "Y" acceleration (LA) from the lateral acceleration sensor 18 (step 64) and repeats the steps.

The processor 30 then determines if vehicle rollover is predicted in view of the angular rate and the vertical acceleration (decision step 68). When the processor 30 does not predict a vehicle rollover, the program returns to obtain the angular rate (step 62).

When vehicle rollover is predicted (step 62), the processor 30 then determines whether a fast roll or a slow roll event is occurring (step 70). This determination is shown in detail in FIG. 4 as discussed below. In operation, a flag or stored output is set to provide a determined fast roll event output or a slow roll event output and the program advances (step 76).

The program executed by the processor 30 operates the restraint devices 40 (step 76). More specifically, the processor 30 looks for a flag or output indicating a fast roll event or a slow roll event. When a fast roll event output is presented, the processor 30 provides an output to the seat belt pretensioner 44 to properly pretension at least one seat belt (step 76). Further, the processor 30 communicates with the side airbag and inflatable curtain controller 46 to actuate the side airbag inflatable curtain 48 and the side airbag 49 (step 76). Thus, the control system 10 operates at least one restraint device 40 in response to the fast roll event output when the angular rate and vertical acceleration predict vehicle rollover. More specifically, the control system 10 deploys the side airbag inflatable curtain 48, deploys the side airbag 49, and operates the seat belt pretensioner 44 in response to the fast roll event output. Deploying of the side airbag inflatable curtain 48 and of the side airbag 49 is performed by the side airbag and inflatable curtain controller 46.

When a slow roll event output is present, the processor 30 provides an output only to the seat belt pretensioner 44 to properly pretension at least one seat belt (step 76). Thus, the response to the slow roll event by the control system 10 consists of operating the seat belt pretensioner 44 without deploying the side airbag inflatable curtain 48 or the side airbag 49. Other arrangements are contemplated.

Subroutine

Figure 4:
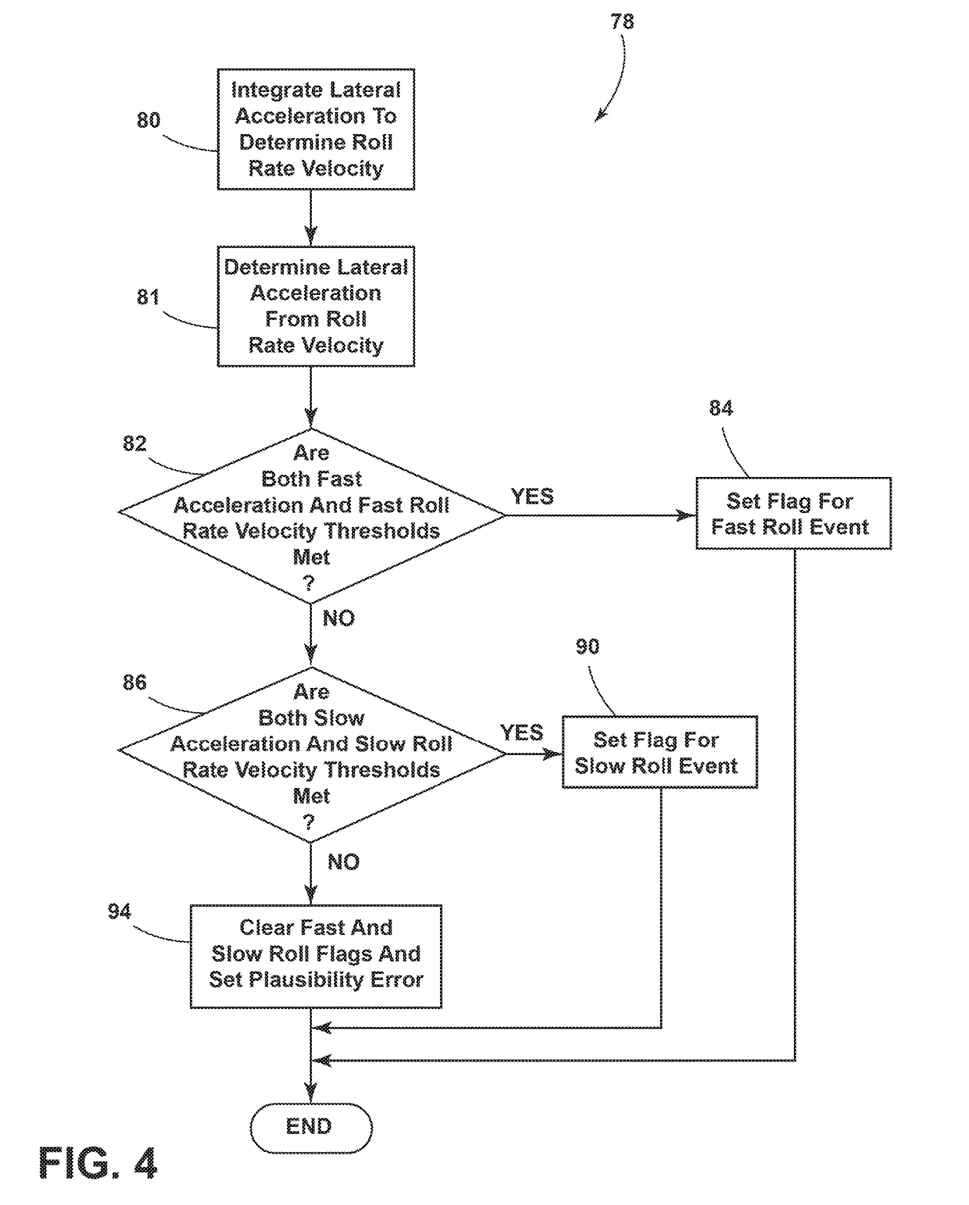
FIG. 4 is a flow chart of a method for determining of a fast roll or a slow roll of the vehicle for the method of FIG. 3.

FIG. 4 is a flowchart 78 of a subroutine or program that executes an algorithm. Thus, FIG. 4 sets forth in detail the operation of the electronic controller 26 in determining a fast roll event or slow roll event (step 70) in FIG. 3. The processor 30 of the electronic controller 26 is configured to integrate the sensed lateral acceleration to determine a roll rate velocity (step 80) for the vehicle 50. The lateral acceleration of a slow roll event caused by the vehicle 50 laterally moving onto soil results in a soil-tripped rollover event. The lateral acceleration is even greater during a fast roll event and impact of a wheel with a curb results in a curb-tripped rollover event. Thus, the slow roll event output corresponds to a soil-tripped rollover event and the fast roll event output corresponds to a curb-tripped rollover event.

In some embodiments, the processor 30 determines a lateral acceleration for the vehicle 50 from the roll rate velocity (step 81). For instance, the lateral acceleration can be determined from the slope of the roll rate velocity or by calculating a derivative of the roll rate velocity. In some embodiments, the determined lateral acceleration has a smoother value than a raw acceleration sensed by the lateral acceleration sensor 18. Other processing to determine a smoothed lateral acceleration is also contemplated. Further, the sensed raw acceleration may be utilized by the processor 30 without modification in some embodiments.

After lateral acceleration is determined (step 81), the processor 30 compares the sensed lateral acceleration with a fast lateral acceleration threshold and compares the determined roll rate velocity with a fast roll rate velocity threshold (decision step 82). In the instance that both thresholds are met, meaning the sensed or calculated lateral acceleration is greater than the fast lateral acceleration threshold and the roll rate velocity is greater than the corresponding fast roll threshold, the processor 30 sets a flag for fast roll event output (step 84). In one embodiment, the two thresholds for the fast roll event can be predetermined set values. In another embodiment, a look-up table has different values for the fast roll rate velocity threshold depending on the determined lateral acceleration. In another embodiment, a look-up table has different values for the fast lateral acceleration threshold depending on the determined roll rate velocity. Finally, calculations weighted based on the determined lateral acceleration and the determined roll rate velocity may result in setting of the fast roll event output/flag. In various embodiments, the fast roll rate velocity threshold in meters/second (m/sec.) is dependent on the size, model, wheel base and other properties of a vehicle 50. Likewise, the fast lateral acceleration threshold in m/sec.$^2$ varies significantly from vehicle to vehicle. Upon setting the fast roll event output (step 84) the routine in FIG. 4 is completed and the processor 30 advances to the selectively operate restraint devices block (step 76) in FIG. 3.

In the instance that the fast roll event is not detected, the routine in FIG. 4 then compares the lateral acceleration with a slow lateral acceleration threshold and compares the determined roll rate velocity with a slow roll rate velocity threshold (step 86). In the instance that both thresholds are met, meaning the sensed or calculated lateral acceleration and roll rate velocity are greater than the corresponding slow roll thresholds, the processor 30 sets a flag for a slow roll event output (step 90). The two thresholds for the slow roll event can be predetermined set values for a particular vehicle 50. In another embodiment, a look-up table has different values for the slow roll rate velocity threshold depending on the determined lateral acceleration. In another embodiment, a look-up table has different values for the slow lateral acceleration threshold depending on the determined roll rate velocity. Finally, calculations weighted based on the determined lateral acceleration and the determined roll rate velocity may result in setting a slow roll event output/flag. The slow lateral acceleration threshold in m/s$^2$ and the slow roll rate velocity threshold in m/s vary depending on characteristics of the vehicle 50. Upon setting the slow roll event output (step 90) the routine in FIG. 4 is completed and the processor 30 advances to the selectively operate restraint devices block (step 76) in FIG. 3.

In the instance that the slow roll event is not detected by the routine in FIG. 4, then there must be some type of error or plausibility failure in the system as to rollover detection. The processor 30 clears any fast roll flag or slow roll flag previously stored (step 94) and sets a plausibility error. Thus, a plausibility error occurs when the lateral acceleration and the roll rate velocity do not result in either a fast roll event or a slow roll event. Therefore, it is unclear whether any rollover event, much less the type of rollover event is occurring and a plausibility error is set or stored in the electronic controller 26. The restraint devices 40 are controlled in a different manner or the control system 10 executes an error checking program or otherwise attempts to reset the control system in one instance. Upon clearing any fast roll or slow roll flag (step 94), the routine shown in FIG. 4 is completed and the processor 30 returns to the selectively operate restraint devices block (step 76) in FIG. 3.

In one embodiment, only the lateral "Y" acceleration determines whether a fast roll event or a slow roll event is occurring. Another embodiment integrates the lateral acceleration once in determining the type of roll event. Other embodiments for integrating the lateral acceleration a second time to obtain a displacement that is utilized in determining the type of roll event are provided. By utilizing the lateral acceleration and by providing calculations and/or a look-up table, the embodiments present a simplified approach to determining roll events.

In each embodiment, the fast lateral acceleration threshold is greater than the slow roll acceleration threshold. Further, the fast roll rate velocity threshold is greater than the slow roll rate velocity threshold. Thus, when the lateral acceleration is less than the fast lateral acceleration threshold and greater than a slow lateral acceleration threshold and the roll rate velocity is greater than a slow roll rate velocity threshold, a slow roll event output is provided. In one embodiment, the greater lateral acceleration and roll rate velocity required for a fast roll event as compared to a slow roll event results in the triggering of the restraint devices 40 within about 100-300 milliseconds for a fast roll event as compared to about 600-800 milliseconds for a slow roll event.

Utilizing the angular rate and vertical acceleration to trigger the restraint devices 40 provides a second sensor requirement for operation. Thus, plausibility is gained as a single sensor cannot erroneously trigger the restraint devices 40. While angular rate in combination with vertical acceleration is disclosed, other sensed properties in addition to angular rate, or instead of angular rate may trigger the restraint devices Further, when a fast roll or slow roll event cannot be determined, plausibility of the control system 10 is questioned.

Thus, the invention provides, among other things, a method and system for determining a fast roll event or a slow roll event of a vehicle 50 for varying the control of restraint systems. The fast roll and slow roll events are determined without a timer device. Various features and advantages of the invention are set forth in the following claims.

What is claimed is:

1. A method of operating at least one restraint device in a vehicle during a fast roll event or a slow roll event, the method comprising:
   sensing a lateral acceleration of the vehicle;
   sensing a vertical acceleration of the vehicle;
   sensing an angular rate of the vehicle determined about a longitudinal axis;
   integrating the lateral acceleration to obtain a roll rate velocity;
   predicting vehicle rollover from the angular rate and the vertical acceleration;
   when vehicle rollover is predicted, and
      when the lateral acceleration is greater than a fast lateral acceleration threshold and the roll rate velocity is greater than a fast roll rate velocity threshold, setting a fast roll event output,
      when the lateral acceleration is less than the fast lateral acceleration threshold and greater than a slow lateral acceleration threshold, and the roll rate velocity is greater than a slow roll rate velocity threshold, setting a slow roll event output,
   operating the restraint device of the vehicle in response to one of the fast roll event output and the slow roll event output, and
   providing a plausibility error when the lateral acceleration and the roll rate velocity do not result in either the fast roll event output or the slow roll event output.

2. The method according to claim 1, wherein operating the at least one restraint device in response to the fast roll event output includes deploying a side airbag, deploying a side airbag inflatable curtain and operating a seat belt pretensioner.

3. The method according to claim 2, wherein operating the restraint device in response to the slow roll event includes operating a seat belt pretensioner.

4. The method according to claim 3, wherein operating the at least one restraint device in response to the slow roll event output is limited to operating the seat belt pretensioner.

5. The method according to claim 3, wherein the slow roll event generally is a soil-tripped rollover event and the fast roll event generally is a curb-tripped rollover event, and
   wherein the sensing of the lateral acceleration includes determining the lateral acceleration from the slope of the roll rate velocity.

6. A control system for at least one restraint device in a vehicle, the system comprising:
   an angular rate sensor for providing an angular rate determined about a longitudinal axis of the vehicle;
   a vertical acceleration sensor for providing vertical acceleration of the vehicle;
   a lateral acceleration sensor for providing a lateral acceleration of the vehicle; and
   an electronic controller including a processor and a memory, the processor configured to:
      predict vehicle rollover based on the angular rate and the vertical acceleration,
      integrate the lateral acceleration to determine a roll rate velocity,
      when vehicle rollover is predicted, and
         when the lateral acceleration is greater than a fast lateral acceleration threshold and the roll rate velocity is greater than a fast roll rate velocity threshold, provide a fast roll event output,
         when the lateral acceleration is less than the fast lateral acceleration threshold and greater than a slow lateral acceleration threshold, and the roll rate velocity is greater than a slow roll rate velocity threshold, provide a slow roll event output,
      operate the at least one restraint device consisting of operating a seat belt pretensioner in response to the slow roll event output without deploying a side airbag or a side airbag inflatable curtain, and
      determine a plausibility error when the lateral acceleration and the roll rate velocity do not result in either the fast roll event output or the slow roll event output.

7. The control system according to claim 6, the at least one restraint device including an inflatable side airbag;
   a side airbag inflatable curtain;
   a side airbag and inflatable curtain controller; and
   a seat belt pretensioner,
   wherein when vehicle rollover is predicted, operating the at least one restraint device in response to the fast roll event output includes deployment of the side airbag and deployment of the side airbag inflatable curtain by the side airbag and inflatable curtain controller, and operating of the seat belt pretensioner.

8. The control system according to claim 6, wherein the slow roll event output generally corresponds to a soil-tripped rollover event and the fast roll event output generally corresponds to a curb-tripped rollover event.

9. A method of operating at least one restraint device in a vehicle during a fast roll event or a slow roll event, the method comprising:
   sensing an angular rate determined about a longitudinal axis of the vehicle with an angular rate sensor;
   sensing a vertical acceleration of the vehicle with a vertical acceleration sensor;
   sensing a lateral acceleration of the vehicle with a lateral acceleration sensor;
   integrating the lateral acceleration to obtain a roll rate velocity;
   predicting vehicle rollover from the angular rate and the vertical acceleration;
   when the lateral acceleration is greater than a fast lateral acceleration threshold and the roll rate velocity is greater than a fast roll rate velocity threshold, providing a fast roll event output;
   when the lateral acceleration is less than the fast lateral acceleration threshold and greater than a slow lateral acceleration threshold, and the roll rate velocity is greater than a slow roll rate velocity threshold, providing a slow roll event output;
   when vehicle rollover is predicted, operating the at least one restraint device in response to either the fast roll event or the slow roll event; and
   providing a plausibility error when the lateral acceleration and the roll rate velocity do not result in either the fast roll event or the slow roll event, and vehicle rollover is predicted.

10. The method according to claim 9, wherein operating the at least one restraint device in response to the slow roll event output is limited to operating a seat belt pretensioner.

11. The method according to claim 9, wherein operating the at least one restraint device in response to the fast roll event output includes operating a seat belt pretensioner, deploying a side airbag and deploying a side airbag inflatable curtain.

12. The method according to claim 9, wherein the slow roll event generally is a soil-tripped rollover event and the fast roll event generally is a curb-tripped rollover event.

13. The method according to claim 9, wherein the sensing of the lateral acceleration includes determining the lateral acceleration from a slope of the roll rate velocity.

\* \* \* \* \*